UNITED STATES PATENT OFFICE

ERLING JOHNSON, OF ODDA, NORWAY, ASSIGNOR TO THE FIRM ODDA SMELTEVERK A/S, OF ODDA, NORWAY

MANUFACTURE OF FERTILIZERS

No Drawing. Application filed December 14, 1929, Serial No. 414,219, and in Norway December 14, 1928.

In my copending application Ser. No. 391,506, now Patent 1,816,285 granted July 28, 1931, I have described a process for treating phosphate rock and similar phosphate material with nitric acid, by which process crystallized calcium nitrate and a mother liquor containing phosphoric acid are obtained.

The present invention relates particularly to the further treatment of said mother liquor for production of di-calcium phosphate (eventually besides some tri-calcium phosphate) and nitrogen compounds (such as ammonium salts, ammonium nitrate f. inst.).

The phosphate products and the nitrogen compounds may either be obtained separately and used for fertilizing purposes or compound fertilizers may be produced which contain di-calcium phosphate as main phosphoric acid component.

According to my application Ser. No. 391,506. Phosphates (tri-calcium phosphates) are dissolved by means of nitric acid in compliance with the equation

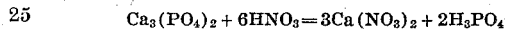

$$Ca_3(PO_4)_2 + 6HNO_3 = 3Ca(NO_3)_2 + 2H_3PO_4$$

By suitable cooling of the solution obtained the bulk of the calcium nitrate may be caused to crystallize. Eventually a filtration of insoluble impurities may be effected previous to crystallization. By use of appropriate conditions as to concentration and temperature the calcium nitrate, $Ca(NO_3)_2.4H_2O$ crystallizes out in quantities representing even up to 90 per cent of the calcium present in the mother liquor.

The prevailing conditions may be illustrated by the following statement:

(1) *Chemical reaction*

$$2Ca_3(PO_4)_2 + 12HNO_3 + 24H_2O = 6Ca(NO_3)_2.4H_2O + 4H_3PO_4$$

(2) *Physical process*

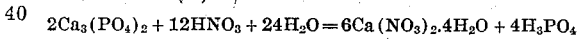

| | |
|---|---|
| Of the products of reaction | $6Ca(NO_3)_2.4H_2O + 4H_3PO_4$ |
| May be separated out as crystals | $5Ca(NO_3)_2.4H_2O$ |
| Thus leaving in the mother liquor | $Ca(NO_3)_2.4H_2O + 4H_3PO_4$ |

The mother liquor obtained after filtration from the calcium nitrate crystals may easily contain 4 molecules of phosphoric acid per molecule of dissolved calcium nitrate as shown in the example above. The relative ratio between the said components may however be varied within wide limits, according to the working conditions used, i. e. according to the relative proportions of phosphate and nitric acid used in the dissolving operation, the cooling conditions during the crystallization of the calcium nitrate etc. It is evident that if the highest possible output of di-calcium phosphate is desired, less calcium nitrate will be caused to crystallize than shown in the statement above. In the following some examples are given to illustrate how the output of di-phosphate is influenced by the more or less complete separation of calcium nitrate.

In the present process the mother liquor, which results after crystallization of calcium nitrate and filtration is treated with gaseous ammonia or ammonia liquor.

Di-calcium phosphate is immediately precipitated according to the equation:

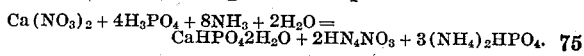

$$Ca(NO_3)_2 + 4H_3PO_4 + 8NH_3 + 2H_2O = CaHPO_4.2H_2O + 2HN_4NO_3 + 3(NH_4)_2HPO_4.$$

The neutralization is effected at a moderate temperature, and the further treatment of the precipitated di-phosphate by filtration, washing and drying is likewise carried out at a convenient moderate temperature in order to avoid any considerable diminution in the solubility of the product.

The filtrate obtained represents a solution of ammonium nitrate and ammonium phosphate. In the equation given above di-ammonium phosphate is assumed. If less ammonia is used mono-ammonium phosphate or a mixture of mono- and di-ammonium phosphate is of course obtained. By direct evaporation of the filtrate an excellent fertilizer containing nitrogen and phosphoric acid is obtained.

By way of example the following statement illustrates a modus of carrying out the new process.

Example 1

A solution, prepared according to "test 3" of my application Ser. No. 391,506 was used. Through cooling of this solution more than 80 per cent of the original content of calcium nitrate was crystallized out. The remaining mother-liquor had the following composition: 23 per cent phosphoric acid ($P_2O_5$), 5,54 per cent CaO as nitrate corresponding to 2,74 per cent nitrate nitrogen, and a content of nitric acid equivalizing 2,00 per cent nitrogen, thus a total nitrogen content of 4,74 per cent. To 50 parts of this solution 25 parts of ammonia liquor of 20 per cent N were added. Di-calcium phosphate precipitated and was filtered off and washed in the usual manner. 8,5 parts of di-phosphate were obtained with a content of 40 per cent phosphoric acid. The filtrate yielded after evaporation and drying 27,5 parts of a product containing: 28,05 per cent phosphoric acid (water-soluble) and 26,80 per cent nitrogen. Of the nitrogen 18,2 per cent was ammonia nitrogen and 8,5 per cent nitrate nitrogen. The phosphoric acid was mainly in the form of di-ammonium phosphate. The total content of plant-food of the product was then 54,85 per cent.

This product, being composed of ammonium phosphate and ammonium nitrate was, while still moist, mixed with potassium chloride in the proportion 6:4. After drying an excellent spreadable and stable three-componential fertilizer of the following composition was obtained:

| | | Relative ratio |
|---|---|---|
| 16,8 per cent $P_2O_5$ | | 1 |
| 24,0 per cent $K_2O$ | | 1,5 |
| 16,0 per cent N | | 1 |

It is quite evident that, all according to the composition of the primary solution, the quantity of ammonia used for the precipitation of di-phosphate, etc., mixed products may result which contain nitrogen and phosphoric acid in very different proportions, and that said products after being mixed with, respectively brought into reaction with different quantities of potassium salts such as nitrate, chloride, phosphate or sulphate, may give universal compound fertilizers of desired composition.

The following example illustrates a modus of carrying out the process, when a solution of phosphate rock in nitric acid is used, from which only so much calcium nitrate was crystallized, that the rest if lime left in the mother liquor is just sufficient to combine with all the phosphoric acid in the solution to form di-calcium phosphate.

Example 2

100 parts of phosphate rock of 35 per cent were dissolved by means of 214,5 parts of nitric acid of 50 per cent (equivalizing 23,5 parts of nitrogen) at a temperature of 60–80° C. under stirring. After filtration from insoluble impurities 292 parts of solution of the following composition were obtained:

34 parts of $P_2O_5$ = 11,6%.
47 parts of CaO = 16,0%.
23,5 parts of nitric acid nitrogen = 8,0%.

Already by cooling the solution to room temperature, respectively to 10–15° C., calcium nitrate crystallized out. The crystallization was discontinued when 92 parts of calcium nitrate, containing 11% nitrogen (equivalizing 10,1 parts of nitrate nitrogen and 20,2 parts of lime) had separated out.

After separation of the calcium nitrate on a filter or in a centrifugal machine 200 parts of solution were obtained of the composition:

34 parts of $P_2O_5$ = 17 per cent.
26,8 parts of CaO = 13,4 per cent.
13,4 parts of nitrate nitrogen = 6,7 per cent.

By adding to this solution 67 parts of ammonia liquor of 20 per cent N di-calcium phosphate precipitated. Instead of ammonia liquor gaseous ammonia may be used for precipitation. The following reaction takes place:

$$2H_3PO_4 + 2Ca(NO_3)_2 + 4NH_3 = 2CaHPO_4 + 4(NH_4)NO_3$$

After filtration, washing and drying at moderate temperature 83 parts of di-calcium phosphate were obtained with a content of 41 per cent $P_2O_5$ (citrate-soluble). Upon evaporation the filtrate yielded 76,4 parts of ammonium nitrate of 35 per cent nitrogen, the nitrogen being in equal parts ammonia nitrogen and nitrate nitrogen.

According to the modus just explained of carrying out the process 100 parts of mineral phosphate yield the following final products:

(1) 83 parts of di-calcium phosphate of 41 per cent $P_2O_5$ = 34 parts.
(2) 92 parts of calcium nitrate of 11 per cent N = 10,1 parts.
(3) 76,4 parts of ammonium nitrate of 35 per cent N = 26,8 parts.

The calcium nitrate obtained by crystallization from the solution of mineral phosphate in nitric acid may in known manner be worked into commercial products of 13–15,5 per cent nitrogen.

The separately obtained di-calcium phosphate may be mixed with the calcium nitrate from the process proper and with urea. In this way high-grade, non hygroscopic, nitrogen and phosphoric acid containing fertilizers are obtained of physiologically alkaline reaction. So for instance, if a molten mass of the 92 parts of calcium nitrate (10,1 parts of nitrate nitrogen) and 52 parts of urea (23,9 parts of urea nitrogen) is quickly stirred up and mixed with the 83 parts of di-phosphate (which must not necessarily be dry), this mixture when distributed in the shape of drops in a drying device, preferably under vacuum, will give 200 parts of a granular product which is stable and but little hygroscopic, and has the following composition:

17 per cent phosphoric acid as di-phosphate.

5,1 per cent nitrate nitrogen, 11,9 per cent urea nitrogen, total nitrogen 17 per cent.

The nitrogen content of the product may be modified according to the quantity of urea admixed. If potassium salts are simultaneously added, high-grade, three-componential fertilizers are obtained of physiologically alkaline nature. If for instance 70 parts of the above product is mixed with 10 parts of potassium nitrate and 20 parts of potassium phosphate (primary salt) a product of the following composition will result:

20 per cent $P_2O_5$ (of which more than one half is citrate-soluble and the rest water-soluble).

11,4 per cent $K_2O$ and 13,2 per cent nitrogen, of which 4,87 per cent is nitrate nitrogen and 8,33 per cent urea nitrogen.

Instead of isolating the di-phosphate as separate product it may be left in the ammonium nitrate solution or in a portion of it during the evaporation or desiccation of the latter. In this way fertilizers are obtained which contain di-phosphate and ammonium nitrate in varied adequate proportions. By further admixture of potassium salts, eventually also of ammonium salts universal fertilizers may be produced with di-phosphate as phosphoric acid component.

Thus the mother-liquor obtained in example 2 when it is neutralized with ammonia and desiccated under vacuum will yield 159,4 parts of a product containing some 25 per cent $P_2O_5$, mainly in the form of di-phosphate and some 17 per cent nitrogen as ammonium nitrate.

If one half of the ammonium nitrate solution is removed by filtration or decantation, while the rest of the solution together with the di-phosphate is brought to dryness a product will result which contains 33 per cent $P_2O_5$ (mainly in the form of di-phosphate) and 10,9 per cent nitrogen as ammonium nitrate.

By suitable addition of other ammonium salts such as ammonium phosphate, -nitrate, -chloride or -sulphate any desired ratio between phosphoric acid and nitrogen may be established, and stable, almost non-hygroscopic, nitrogen and phosphoric acid fertilizers be obtained. By appropriate admixture of potassium salts, such as potassium nitrate, -sulphate, -phosphate or -chloride, eventually with addition of nitrogen compounds as f. inst, urea very sufficient mixed fertilizers of favorable physical properties are obtained.

If for inst. 60 parts of the product just mentioned are mixed with 30 parts of commercial potassium sulphate and 10 parts of di-ammonium phosphate a fertilizer is obtained which in the dry state contains:

20 per cent phosphoric acid as di-phosphate, 5 per cent water-soluble phosphoric acid, total 25 per cent $P_2O_5$.

15 per cent $K_2O$.

5,3 per cent ammonia nitrogen, 3,3 per cent nitrate nitrogen, total 8,6 per cent N.

The total content of plant food amounts to somewhat more than 48 per cent.

It is evident, that, just according to the composition of the starting material, nature and quantity of the admixtures products of desired composition and of favorable physical properties may be obtained.

Instead of by means of ammonia the precipitation of the di-phosphate may be effected by means of ammonium carbonate or alkali carbonates. In the latter case the nitric acid nitrogen will appear as alkali nitrates and the surplus of phosphoric acid as alkali phosphates.

If an excess of precipitants and higher temperature are used, the phosphoric acid will appear as finely divided tri-calcium phosphate respectively as a mixture of di-phosphate and tri-phosphate.

For bringing out products for fertilizing purposes the exclusive precipitation as di-phosphate is preferred, because this product is more easily assimilated by the plants. The conditions for sole formation of di-phosphate are, as is well known, that only a slight surplus of precipitating agent is used and that the further handling of the di-phosphate precipitate is carried out at sufficiently low temperature, in order to avoid any considerable transformation of the easy soluble di-phosphate into less soluble forms of phosphates.

I claim:

1. A process of manufacturing fertilizers from phosphate rock and similar phosphate material, comprising treating the phosphate material with nitric acid to form a solution containing free phosphoric acid and calcium nitrate, crystallizing from said solution part of the calcium nitrate formed, separating the calcium nitrate crystals from the solution, precipitating di-calcium phosphate in the remaining mother liquor and removing the water of said mother liquor.

2. A process of manufacturing fertilizers from phosphate rock and similar phosphate material, comprising treating the phosphate material with nitric acid to form a solution containing free phosphoric acid and calcium, nitrate, crystallizing from said solution part of the calcium nitrate formed, separating the crystals from the solution, adding ammonia to the remaining mother liquor to precipitate di-calcium phosphate and removing the water from said mother liquor.

3. A process of manufacturing fertilizers from phosphate rock and similar phosphate material, comprising treating the phosphate material with nitric acid to form a solution containing free phosphoric acid and calcium nitrate, crystalling from said solution part of the calcium nitrate formed, separating the crystals from the solution, adding ammonium carbonate to the remaining mother liquor to precipitate di-calcium phosphate and removing the water from said mother liquor.

4. A process of manufacturing fertilizers from phosphate rock and similar phosphate material, comprising treating the phosphate material with nitric acid to form a solution containing free phosphoric acid and calcium nitrate, crystallizing from said solution part of the calcium nitrate formed, separating the crystals from the solution, adding an alkali carbonate to the remaining mother liquor to precipitate di-calcium phosphate and removing the water from said mother liquor.

5. A process of manufacturing fertilizers from phosphate rock and similar phosphate material, comprising treating the phosphate material with nitric acid to form a solution containing free phosphoric acid and calcium nitrate, crystallizing from said solution part of the calcium nitrate formed, separating the crystals from the solution, precipitating di-calcium phosphate from the remaining mother liquor, separating the di-phosphate from the solution and evaporating the solution to dryness.

6. A process of manufacturing fertilizers from phosphate rock and similar phosphate material, comprising treating the phosphate material with nitric acid to form a solution containing free phosphoric acid and calcium nitrate, crystallizing from said solution about one third of the calcium nitrate formed, separating the crystals from the solution, precipitating from the remaining mother liquor as di-calcium phosphate practically all the calcium nitrate in solution together with practically all the phosphoric acid present, separating the di-phosphate from the solution and evaporating the solution to dryness.

7. A process of manufacturing fertilizers from phosphate rock and similar phosphate material, comprising treating the phosphate material with nitric acid to form a solution containing free phosphoric acid and calcium nitrate, crystallizing from said solution part of the calcium nitrate formed, separating the crystals from the solution, precipitating in the mother liquor the calcium as di-calcium phosphate, adding nitrogen compounds and removing the water.

8. A process of manufacturing fertilizers from phosphate rock and similar phosphate material, comprising treating the phosphate material with nitric acid to form a solution containing free phosphoric acid and calcium nitrate, crystallizing from said solution part of the calcium nitrate formed, precipitating in the mother liquor the calcium as di-calcium phosphate separating the di-phosphate from the solution, adding to the solution nitrogen compounds of the type including ammonium salts, urea and such like and desiccating the solution.

9. A process of manufacturing fertilizers from phosphate rock and similar phosphate material, comprising treating the phosphate material with nitric acid to form a solution containing free phosphoric acid and calcium nitrate, crystallizing from said solution part of the calcium nitrate formed, separating the crystals from the solution, precipitating in the remaining mother liquor di-calcium phosphate, adding potassium salts and removing the water.

10. A process of manufacturing fertilizers from phosphate rock and similar phosphate material, comprising treating the phosphate material with nitric acid to form a solution containing free phosphoric acid and calcium nitrate, crystallizing from said solution part of the calcium nitrate formed, separating the crystals from the solution, precipitating from the remaining mother liquor di-calcium phosphate, separating the di-phosphate from the solution, adding to the solution potassium salts and desiccating the solution.

11. A process of manufacturing fertilizers from phosphate rock and similar phosphate material, comprising treating the phosphate material with nitric acid to form a solution containing free phosphoric acid and calcium nitrate, crystallizing from said solution part of the calcium nitrate formed, separating the crystals from the solution, precipitating from the remaining mother liquor di-calcium phosphate, separating the di-phosphate from the solution, mixing said di-phosphate with the calcium nitrate obtained by crystallization from the solution of the mineral phosphate in nitric acid, and with urea, and bringing the solution resulting after precipitation of the di-phosphate to dryness.

12. Process of manufacturing fertilizers from phosphate rock and similar phosphate material, comprising treating the phosphate material with nitric acid to form a solution containing free phosphoric acid and calcium nitrate, crystallizing from said solution part of the calcium nitrate formed, separating the crystals from the solution, precipitating from the remaining mother liquor di-calcium phosphate separating the di-phosphate from the solution, mixing the di-phosphate with calcium nitrate, urea and further fertilizing constituents such as ammonium—and potassium salts, converting the mixture into the dry state and bringing the solution resulting after precipitation of the di-phosphate to dryness.

In testimony that I claim the foregoing as my invention I have signed my name.

ERLING JOHNSON.